Oct. 22, 1968 M. WORMAN 3,406,763
ROCK DRILL
Filed Sept. 19, 1966 2 Sheets-Sheet 1

INVENTOR.
MARTIN WORMAN
BY
*Robert L. Paquin*
ATTORNEY

Oct. 22, 1968     M. WORMAN     3,406,763

ROCK DRILL

Filed Sept. 19, 1966     2 Sheets-Sheet 2

INVENTOR.
MARTIN WORMAN
BY
Robert R. Paquin
ATTORNEY

United States Patent Office 3,406,763
Patented Oct. 22, 1968

3,406,763
ROCK DRILL
Martin Worman, Phillipsburg, N.J., assignor to Ingersoll-Rand Company, New York, N.Y., a corporation of New Jersey
Filed Sept. 19, 1966, Ser. No. 580,546
18 Claims. (Cl. 173—47)

ABSTRACT OF THE DISCLOSURE

A rock drill including a fluid operated motor connected through reduction gearing to rotatably drive the drill steel relative to the drill piston. The motor is connectible to receive pressurized fluid either continuously or intermittently during drill operation whereby the drill steel may be continuously rotated, rotated only during movement of the piston towards the drill steel, or rotated only during piston movement away from the drill steel.

---

This invention relates to drilling apparatus and has more particular reference to rock drills of the rotary percussive type wherein the drill steel is rotatable relative to the drill piston.

Conventional rock drills of this type frequently are constructed to rotate the drill steel relative to the drill piston continuously throughout their operation. This continuous rotation is desirable when the ground to be drilled is of a relatively low hardness. When the ground is of a relatively high hardness, however, this continuous rotation becomes undesirable and may even, in fact, damage the drill steel and/or the drill bit. More specifically, as this continuous rotation results in rotation of the drill steel at impact and immediately thereafter, it causes the meshing threads on the drill bit and drill steel to become extremely tight and frequently results in galling which leads to excessive wear and, in many instances, even to fracture.

This disadvantage of continuous drill steeel rotation has been overcome by constructing a rock drill to intermittently rotate its drill steel. Conventionally, however, this intermittent drill steel rotation has generally been provided at the expense of continuous drill steel rotation. That is, conventional rock drills providing intermittent drill steel rotation usually have been incapable of providing continuous drill steel rotation. Thus, the benefits of continuous drill steeel rotation resulting during drilling in ground of a relatively low hardness have usually been unobtainable with rock drills providing intermittent drill steel rotation.

An object of the present invention is to provide a new and improved rock drill which is particularly constructed and arragned to provide alternative continuous and intermittent rotation of the drill steel.

Another object of the invention is to provide a new and improved rock drill of the type set forth which, when providing intermittent drill steel rotation, is controllable to provide rotation of the drill steel either when the drill piston is moving towards the drill steel or, alternatively, when the drill piston is moving away from the drill steel.

Another object is to provide a new and improved rock drill of the type set forth which, although relatively simple and economical in construction, is highly efficient and dependable in operation.

The aforegoing objects, and those other objects and advantages of the invention which will be apparent from the following description taken in connection with the accompanwing drawings, are attained by the provision of a rock drill comprising a housing, and a drill steel associated with the housing adjacent one end of the housing. A piston is disposed within the housing for slidable movement towards and away from the drill steel for delivering impact blows to the drill steel; a piston moving means is provided for causing pressurized fluid to slidably move the piston towards and away from the drill steel; and means are provided for providing pressurized fluid to the piston moving means. The rock drill, further, comprises a fluid operated motor, and means for connecting the fluid operated motor to the drill steel such that operation of the fluid operated motor causes rotation of the drill steel relative to the piston. A first passage means is connected to a continuous source of pressurized fluid for receiving pressurized fluid from the source independently of the piston and communicates with the fluid operated motor for supplying pressurized fluid to the fluid operated motor. A second passage means communicates with the fluid operated motor for supplying pressurized fluid to the fluid operated motor; and a means connects the second passage means to the piston moving means such that, during the movement of the piston, the second passage means receives a pressurized fluid supplied to the piston moving means by the fluid providing means. A means is provided for directing pressurized fluid from the first and second passage means, alternatively, to the fluid operated motor.

Referring to the drawings.

Figures 1, 2:
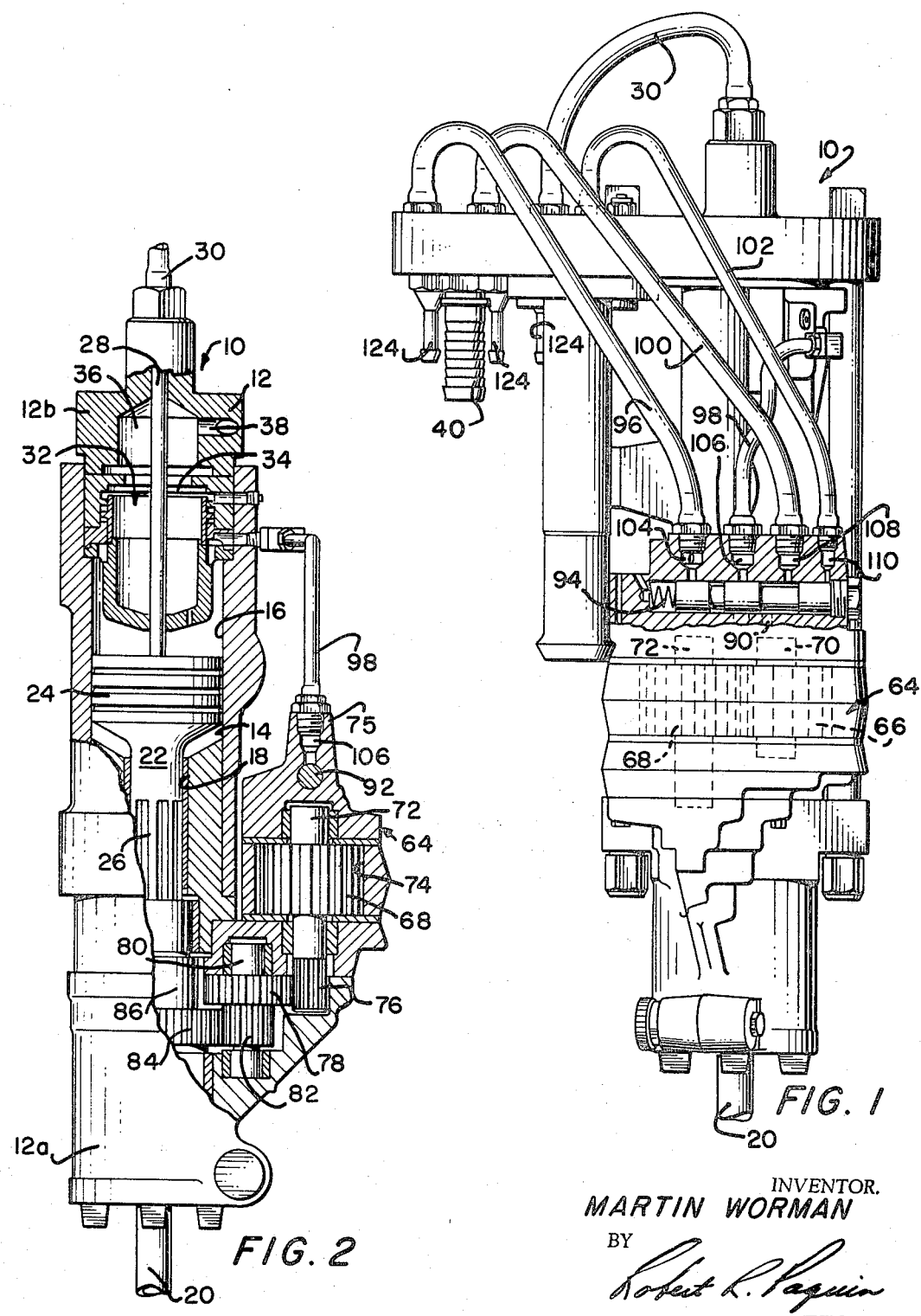
FIG. 1 is an elevational end view, partially broken away and in section, of a rock drill constructed in accordance with the present invention.
FIG. 2 is an elevational side view, partially broken away and in section, of the rock drill illustrated in FIG. 1.
Figure 3:
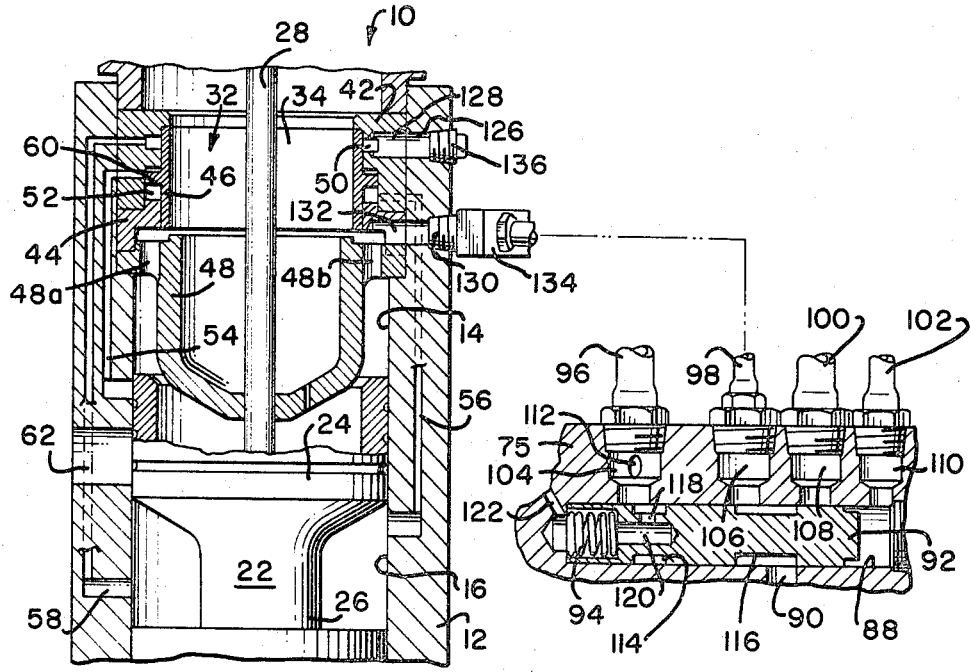
FIG. 3 is an enlarged fragmentary, elevational sectional view of the rock drill illustrated in FIGS. 1 and 2.

Referring more particularly to the drawings wherein similar reference characters designate corresponding parts throughout the several views, 10 generally designates a rotary percussive rock drill which includes a housing or casing 12 containing a piston chamber 14. The piston chamber 14 is formed to include a head section or cylinder 16 and a reduced diameter, stem section 18 which extends longitudinally from the cylinder 16 towards the forward end 12a of the housing 12. A drill steel 20 extends longitudinally within the forward end 12a of the housing 12 and projects forwardly of the latter. The drill steel 20 is suitably connected for longitudinal movement independent of the housing 12. A piston 22 is slidably disposed within the piston chamber 14 for reciprocating movement towards and away from the drill steel 20. The piston 22, as illustrated in FIGS. 2 and 3, comprises a piston head 24 which is disposed within the cylinder 16 and a piston stem 26, formed integrally with the piston head 24, which extends into the stem section 18 and is adapted to deliver impact blows to the drill steel 20 during the reciprocation of the piston 22.

A tube 28 is disposed longitudinally through the piston 22 and the drill steel 20. The tube 28 is connected at the rearward end 12b of the housing 12 to a hose 30 which may be connected, in turn, to a source (not shown) of pressurized fluid such that pressurized fluid is supplied through the tube 28 to the drilling surface. Alternatively, however, the hose 30 may be connected such that cuttings from the drilling surface are drawn through the tube 28 or such that the tube 28 may be utilized for any other purpose for which it might be suitable.

The valve means for controlling the reciprocating movement of the piston 22 comprises a spool-type valve 32 which is located in a valve chamber 34 formed within the housing 12 rearwardly of the cylinder 16. A fluid chamber 36 is provided in the rearward end 12b of the housing 12 in fluid communication with the valve chamber 34. A fluid passage 38 connects the fluid chamber 36 with the fluid inlet 40 of the rock drill 10 such that, when the inlet 40 is suitably connected to a source (not shown) of pressurized air during the operation of the rock drill 10, pressurized air flowing through the inlet 40 is directed by the fluid passage 38 and the fluid chamber 36 to the valve chamber 34. The inlet 40, the fluid passage 38, and the fluid chamber 36 thus cooperate as a means for providing pressurized air to the valve chamber 34.

The spool-type valve 32 is formed from a plurality of valve plates 42, 44, 46, 48, the latter valve plate 48 being disposed at the forward end of the valve chamber 34 and defining the rearward end of the cylinder 16. The valve plate 42 is formed with an annular recess 50 which is connected to the forward end of the cylinder 16 through a fluid passage 58. The valve plates 42, 44 cooperate to define an annular recess 52 which is connected to the cylinder 16 through the fluid passages 54, 56. The valve plate 48 includes a pair of openings 48a, 48b which communicate the valve chamber 34 with the rearward end of the cylinder 16. The valve plate 46 is mounted for slidable movement relative to the valve plates 42, 44, 48 and includes an outwardly extending, annular flange 60 which extends into the annular recess 52. The valve plate 46 serves to control the flow of pressurized fluid through the openings 48a, 48b and the fluid passage 58 and is suitably constructed such that the pressurized fluid is supplied to the cylinder 16 through such openings and such fluid passage, alternatively.

During the operation of the spool-type valve 32, the piston head 24, and hence the piston 22, is forwardly actuated by pressurized air introduced into the cylinder 16 through the openings 48a, 48b and rearwardly actuated by pressurized air flowing into the cylinder 16 through the fluid passage 58. The pressurized air escaping from the cylinder 16 through the fluid passages 54, 56 during the movement of the piston head 24 cooperates with the annular flange 60 on the valve plate 46 to slidably move the valve plate 46 and, hence, operates the spool-type valve 32. The major portion of the pressurized air exhausted from the cylinder 16, however, passes through the exhaust port 62 to the atmosphere. From this brief description of the reciprocation of the piston 22, it will be seen that the spool-type valve 32, the valve chamber 34, the fluid passages 54, 56, 58, the openings 48a, 48b, the exhaust port 62, and the cylinder 16 form a piston moving means which cooperates with the piston head 24 for slidably moving the piston 22 towards and away from the drill steel 20.

A pneumatically operated motor designated generally as 64 is provided for rotating the drill steel 20 relative to the piston 22. The motor 64, as embodied in the illustrated rock drill 10, is of the gear type and comprises the meshing gears 66, 68 which are keyed to the rotatably journalled shafts 70, 72, respectively, and located within a motor chamber 74. The motor chamber 74, as illustrated in FIGS. 1 through 3, is formed in a motor block 75 carried by the housing 12.

The motor 64 is operatively connected to the drill steel 20 through a reduction gearing system which includes a first gear 76 formed upon one end of the shaft 72, a second gear 78 keyed to a rotatably journalled shaft 80 and meshing with the first gear 76, and a third gear 82 also keyed to the shaft 80. A ring gear 84 which is formed upon a rotatable sleeve 86 circumferentially surrounding the drill steel 20 meshes with the third gear 82 to be rotatably driven by the latter. The sleeve 86 is splined or otherwise suitably connected to the drill steel 20 such that the drill steel 20 is rotatable conjointly with, but longitudinally movable independently of, the sleeve 86.

A valve chamber 88 is formed in the motor block 75 and connected by a bore 90 to the motor chamber 74. A valve means, which in the illustrated rock drill 10 is embodied by a slidable valving member 92, is disposed in the valve chamber 88 and biased from one end of the valve chamber 88 by a spring 94. A plurality of fluid conveying hoses 96, 98, 100, 102 are connected to the valve chamber 88 by fluid passages 104, 106, 108, 110, respectively, formed in the motor block 75, the fluid passage 110 being located such that pressurized air flowing through the fluid conveying hose 102 urges the valving member 92 against the biasing spring 94. The motor chamber 74 is connected to the fluid passage 104 independently of the valve chamber 88 by a bore 112 which is formed in the motor block 75 circumferentially of the valve chamber 88.

The valving member 92 is constructed with a plurality of reduced diameter, valving sections 114, 116. The valving section 116 is adapted to alternatively communicate the fluid passages 106, 108 with the bore 90 which is connected to the motor chamber 74. The fluid passages 106, 108 are relatively arranged in the motor block 75 such that, when pressurized air from the fluid conveying hose 102 urges the valving member 92 against the biasing spring 94, the fluid passage 106 is communicated by the valving section 116 with the bore 90 and, in the absence of pressurized air for overcoming the biasing spring 94, the fluid passage 108 is communicated by the valving section 116 with the bore 90. The valving section 114 includes a radially extending fluid passage 118 which communicates through a fluid passage 120 formed axially in the valving member 92 with a bore 122 formed in the motor block 75. The bore 122 communicates with the atmosphere such that pressurized air flowing through the fluid passage 118 is exhausted through the fluid passage 120 and the bore 122 to the atmosphere. The valving sections 114, 116 are relatively arranged in the valving member 92 such that the valving section 114 is connected to the fluid passage 104 when the valving section 116 communicates the fluid passage 106 with the bore 90, and is disconnected from the fluid passage 104 when the valving section 116 communicates the fluid passage 108 with the bore 90.

The fluid conveying hoses 96, 100, 102 are each independently connected to separate connecting stems 124 which, during the operation of the rock drill 10, are connected to a continuous source (not shown) of pressurized air by individual fluid supply hoses (not shown). The flow of pressurized air to each of the fluid conveying hoses 96, 100, 102 through its respective fluid supply hose is controlled by a manually operable control valve (not shown) interposed in such fluid supply hose. The manually operable control valves are independently actuatable and are constructed such that pressurized air may be supplied and exhausted, alternatively, through each of the fluid conveying hoses 96, 100, 102.

The fluid conveying hose 98 is selectively connectible to the rock drill 10 to receive pressurized air from the latter either when the piston 22 is moving towards the drill steel 20 or, alternatively, when the piston 22 is moving away from the drill steel 20. More specifically, a threaded bore 126 is formed in the housing 12 in alignment with a bore 128 which is formed in the valve plate 42 in communication with the annular recess 50. This connection of the threaded bore 126 to the annular recess 50 causes pressurized air to be supplied to the threaded bore 126 only when the valve plate 46 is in a position to allow pressurized air from the valve chamber 34 to flow through the annular recess 50 and the fluid passage 58 to the forward end of the cylinder 16. In other words, pressurized air is supplied through the annular recess 50 and the bore 128 to the threaded bore 126 only when pressurized air is being directed to the cylinder 16 to move the piston 22 away from the drill steel 20.

A threaded bore 130 is formed in the housing 12 in alignment with a bore 132 which is formed in the valve plate 44. The bore 132, as illustrated in FIGS. 2 and 3, is connected to the valve chamber 34 intermediate the valve plate 46 and the opening 48b in the valve plate 48 such that pressurized air is supplied to the bore 130 only when the valve plate 46 is in a position to allow pressurized air from the valve chamber 34 to flow through the openings 48a, 48b to the rearward end of the cylinder 16. In other words, pressurized air is supplied from the valve chamber 34 through the bore 132 to the threaded bore 130 only when pressurized air is being directed to the cylinder 16 to move the piston 22 towards the drill steel 20.

The aforedescribed construction of the threaded bores 126, 130 such that they receive pressurized air at the valve chamber 34 has been found to be preferable. It will be understood, however, that, alternatively, the threaded bores 126, 130 could be constructed to receive pressurized air from the cylinder 16, the fluid passages 54, 56, 58 or any other portion of the piston moving means provided that they are connected such that one receives pressurized air when the piston 22 moves towards the drill steel 20 and the other receives pressurized air when the piston 22 moves away from the drill steel 20.

A threaded connector 134 is provided for connecting the fluid conveying hose 98 to the threaded bores 126, 130, alternatively. A threaded plug 136 is provided for closing the one of the threaded bores 126, 130 other than that connected to the fluid conveying hose 98. Thus, as FIGS. 1 through 3 illustrate the fluid conveying hose 98 connected to the threaded bore 130 by the threaded connector 134, the threaded bore 126 is shown as being closed by the threaded plug 136. Alternatively, however, if the fluid conveying hose 98 be connected to the threaded bore 126 by the threaded connector 134, the threaded bore 130 would be closed by the threaded plug 136.

In the operation of the rock drill 10, with the fluid conveying hose 98 connected to the threaded bore 130 by the threaded connector 134 as illustrated in FIGS. 1 through 3, the drill steel 20 may be rotated either continuously or only during the forward movement of the piston 22. More specifically, to provide continuous drill steel rotation in one direction, the control valve interposed in the fluid supply hose connected to the fluid conveying hose 100 is actuated such that pressurized air is continuously directed through the fluid conveying hose 100 to the valve chamber 88. The control valves contained in the fluid supply hoses connected to the fluid conveying hoses 96, 102 are, conversely, actuated such that pressurized air may be exhausted through their respective connected fluid conveying hoses 96, 102. This connection of the fluid conveying hose 102 to exhaust ensures that the valving member 92 is maintained in its FIG. 1 position wherein the valving section 116 communicates the fluid conveying hose 100 with the bore 90. Thus, the pressurized air entering the valve chamber 88 from the fluid conveying hose 100 flows through the valve chamber 88 and the bore 90 to the motor chamber 74 where it actuates the motor 64 to cause continuous rotation of the drill steel 20 through the aforedescribed reduction gearing system. The pressurized air exhausted from the motor chamber 74 during this continuous rotation flows through the bore 112 to the fluid conveying hose 96.

To provide reverse direction continuous rotation, the control valve interposed in the fluid supply hose connected to the fluid conveying hose 96 is actuated to cause pressurized air to be continuously directed through the fluid conveying hose 96; and the control valve contained in the fluid supply hose connected to the fluid conveying hose 100 is actuated to exhaust fluid flowing through the latter. The pressurized air flowing through the fluid conveying hose 96 flows through the bore 112 to the motor chamber 74 where it actuates the motor 64 to cause the latter to continuously rotate the drill steel 20 through the aforedescribed reduction gearing system. The pressurized air exhausted from the motor chamber 74 flows through the valve chamber 88 to the fluid conveying hose 100.

To provide intermittent drill steel rotation, the control valve in the fluid supply hose connected to the fluid conveying hose 102 is actuated to cause pressurized air to flow through the latter to the valve chamber 88. This pressurized air slidably moves the valving member 92 against the biasing spring 94 to cause the valving section 116 to communicate the fluid passage 106 with the bore 90 and connect the fluid passage 118 with the fluid passage 104, as shown in FIG. 3. Thereafter, each time that the valve plate 46 allows pressurized air to flow through the openings 48a, 48b to the cylinder 16 to move the piston 22 towards the drill steel 20, pressurized air is simultaneously directed through the bore 132 and the threaded bore 130 to the fluid conveying hose 98. The pressurized air thus received by the fluid conveying hose 98 flows through the valve chamber 88 and the bore 90 to the motor chamber 74 where it causes the motor 64 to rotate the drill steel 20 through the aforedescribed reduction gearing system. The pressurized air exhausted from the motor chamber 74 flows through the bore 112 to the fluid passage 104 and thence is exhausted to atmosphere through the fluid passages 118, 120 and the bore 122.

To provide the drill steel 20 with intermittent rotation, which rotation occurs when the piston 22 is moving away from the drill steel 20, the fluid conveying hose 98 is connected through the threaded connector 134 to the threaded bore 126 and the threaded plug 136 to the threaded bore 130. Thereafter, the drill steel 20 is rotated during movement of the piston 22 away from the drill steel 20 in a manner believed to be readily apparent from the aforegoing description.

From the aforegoing, it will be seen that I have provided new and improved means for accomplishing all of the objects and advantages of my invention. It will be understood, however, that, although I have hereinbefore illustrated and specifically described only a single embodiment of my invention, my invention is not limited merely to this hereinbefore illustrated and described embodiment, but contemplates other embodiments and variations employing the teachings and concepts of my invention.

Having thus described my invention, I claim:

1. In a rock drill comprising a housing, a drill steel associated with said housing adjacent one end of said housing, a piston slidably movable in said housing towards and away from said drill steel for delivering impact blows to said drill steel, piston moving means for causing pressurized fluid to slidably move said piston towards and away from said drill steel, and means for providing pressurized fluid to said piston moving means, the combination of:

a fluid operated motor;
means for connecting said fluid operated motor to said drill steel such that operation of said fluid operated motor causes rotation of said drill steel relative to said piston;
first passage means connected to a continuous source of pressurized fluid for receiving pressurized fluid from the source independently of said piston and communicating with said fluid operated motor for supplying pressurized fluid to said fluid operated motor;
second passage means comunicating with said fluid operated motor for supplying pressurized fluid to said fluid operated motor;
means for connecting said second passage means to said piston moving means such that, during the movement of said piston, said second passage means intermittently receives pressurized fluid supplied to said piston moving means by said fluid providing means; and
means for directing pressurized fluid from said first and second passage means, alternatively, to said fluid operated motor.

2. A rock drill according to claim 1, further comprising:
said connecting means comprising means for connecting said second passage means to said piston moving means such that said second passage means receives pressurized fluid when said piston is moving away from said drill steel.

3. A rock drill according to claim 1, further comprising:
said connecting means comprising means for connecting said second passage means to said piston moving means such that said second passage means receives pressurized fluid when said piston is moving towards said drill steel.

4. A rock drill according to claim 1, further comprising:
said connecting means comprising means for selectively connecting said second passage means to said piston moving means such that said second passage means may be connected to receive pressurized fluid when said piston moves towards said drill steel and, alternatively, may be connected to receive pressurized fluid when said piston moves away from said drill steel.

5. A rock drill according to claim 4, further comprising:
said pressurized fluid directing mean comprising fluid operated valve means; and
means for supplying pressurized fluid for operating said valve means.

6. In a rock drill comprising a housing, a drill steel extending within one end of said housing, a piston including a piston head and being slidably disposed in said housing for movement towards and away from said drill steel for delivering impact blows to said drill steel, and piston moving means for causing pressurized fluid to cooperate with said piston head for slidably moving said piston towards and away from said drill steel, said piston moving means comprising a cylinder formed within said housing and containing said piston head, inlet passage means for supplying pressurized fluid to said cylinder, exhaust passage means for discharging pressurized fluid from said cylinder, first valve means connected to a source of pressurized fluid and controlling the flow of pressurized fluid to said cylinder, and chamber means containing said first valve means, the combination of:
a fluid operated motor;
means for connecting said fluid operated motor to said drill steel independently of said piston such that operation of said fluid operated motor causes said drill steel to rotate relative to said piston;
a valve chamber;
means for conveying pressurized fluid from said valve chamber to said fluid operated motor;
first passage means connected to a continuous source of pressurized fluid for receiving pressurized fluid from the source independently of said piston and communicating with said valve chamber for supplying pressurized fluid to said valve chamber;
second passage means communicating with said valve chamber for supplying pressurized fluid to said valve chamber;
means for connecting said second passage means to said piston moving means such that said second passage means receives pressurized fluid from said piston moving means intermittently during the movement of said piston; and
second valve means disposed within said valve chamber for directing pressurized fluid from said first and second passage means, alternatively, to said fluid operated motor.

7. A rock drill according to claim 6, further comprising:
said connecting means comprising means for connecting said second passage means to said piston moving means such that said second passage means receives pressurized fluid when said piston is moving away from said drill steel.

8. A rock drill according to claim 6, further comprising:
said connecting means comprising means for connecting said second passage means to said piston moving means such that said second passage means receives pressurized fluid when said piston is moving towards said drill steel.

9. A rock drill according to claim 6, further comprising:
said connecting means comprising means for selectively connecting said second passage means to said piston moving means such that said second passage means may be connected to receive pressurized fluid when said piston moves towards said drill steel and, alternatively, may be connected to receive pressurized fluid when said piston moves away from said drill steel.

10. A rock drill according to claim 9, further comprising:
said second valve means being fluid operated; and
means for supplying pressurized fluid for operating said second valve means.

11. In a rock drill comprising a housing, a drill steel associated with said housing adjacent one end of said housing, a piston slidably movable in said housing towards and away from said drill steel for delivering impact blows to said drill steel, piston moving means for causing pressurized fluid to slidably move said piston towards and away from said drill steel, and means for providing pressurized fluid to said piston moving means, the combination of:
a fluid operated motor;
means for connecting said fluid operated motor to said drill steel such that operation of said fluid operated motor causes rotation of said drill steel relative to said piston; and
means for communicating said fluid operated motor with a continuous source of pressurized fluid and with said piston moving means such that pressurized fluid may be supplied from the continuous source to said fluid operated motor and, alternatively, pressurized fluid provided to said piston moving means by said fluid providing means may be intermittently supplied to said fluid operated motor.

12. In a rock drill, a drill steel, a piston rearwardly of said drill steel and driven towards and away from said drill steel for percussively driving the latter, a fluid operated motor, means connecting said motor to said drill steel such that operation of said motor causes rotation of said drill steel relative to said piston, and means for connecting said motor, selectively and alternatively, with a continuous source of pressurized fluid and with a source supplying pressurized fluid only during movement of said piston towards said drill steel, whereby said motor may be continuously operated to provide continuous rotation of said drill steel and, alternatively, said motor may be operated only during movement of said piston towards said drill steel to provide rotation of said drill steel only during this latter movement of said piston.

13. A rock drill according to claim 12, further comprising said latter mentioned means including a pair of passage means, one connected to such continuous source and the other connected to such source supplying pressurized fluid only during movement of said piston towards said drill steel, and valve means for permitting alternative fluid flow through said passage means to said motor.

14. In a rock drill, a drill steel, a piston rearwardly of said drill steel and driven towards and away from said drill steel for percussively driving the latter, a fluid operated motor, means connecting said motor to said drill steel such that operation of said motor causes rotation of said drill steel relative to said piston, and means for connecting said motor, selectively and alternatively, with a continuous source of pressurized fluid and with a source supplying pressurized fluid only during movement of said piston away from said drill steel, whereby said motor may be continuously operated to provide continuous rotation of said drill steel and, alternatively, said motor may be operated only during movement of said piston away from said drill steel to provide rotation of said drill steel only during this latter movement of said piston.

15. A rock drill according to claim 12, further comprising said latter mentioned means including a pair of passage means, one connected to such continuous source and the other connected to such source supplying pressurized fluid only during movement of said piston away from said drill steel, and valve means for permitting alternative fluid flow through said passage means to said motor.

16. In a rock drill, a drill steel, a piston rearwardly of said drill steel and driven towards and away from said drill steel for percussively driving the latter, a fluid operated motor, means connecting said motor to said drill steel such that operation of said motor causes rotation of said drill steel relative to said piston, and means for connecting said motor, selectively and alternatively, with a continuous source of pressurized fluid, a source supplying pressurized fluid only during movement of said piston towards said drill steel, and a source supplying pressurized fluid only during movement of said piston away from said drill steel, whereby said motor may be continuously operated to provide continuous rotation of said drill steel, operated only during movement of said piston towards said drill steel to provide rotation of said drill steel only during such movement of said piston, and operated only during movement of said piston away from said drill steel to provide rotation of said drill steel only during such movement of said piston, alternatively.

17. A rock drill according to claim 16, further comprising said latter means including a pair of passage means, one connected to such continuous source and the other selectively connectible to such latter two sources, and valve means for permitting alternative fluid flow from said passage means to said motor.

18. A rock drill according to claim 16, further comprising said latter means being operable to provide bi-directional continuous rotation of said drill steel.

References Cited

UNITED STATES PATENTS

| | | | |
|---|---|---|---|
| 1,452,689 | 4/1923 | Hultquist | 173—105 |
| 1,538,421 | 5/1925 | Clark | 173—105 |
| 1,553,897 | 9/1925 | Glaser | 173—105 |
| 3,157,237 | 11/1964 | Kurt | 173—105 |
| 3,166,131 | 1/1965 | Worman | 173—105 |
| 3,307,638 | 3/1967 | Kurt | 173—105 |

JAMES A. LEPPINK, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,763            October 22, 1968

Martin Worman

It is certified that error appears in the above identified patent and that said Letters Patent are hereby corrected as shown below:

Column 9, line 7, claim reference numeral "12" should read -- 14 --.

Signed and sealed this 10th day of March 1970.

(SEAL)
Attest:

Edward M. Fletcher, Jr.            WILLIAM E. SCHUYLER, JR.
Attesting Officer            Commissioner of Patents